(12) United States Patent
Magee

(10) Patent No.: US 12,458,537 B1
(45) Date of Patent: Nov. 4, 2025

(54) OSMOTIC BANDAGE

(71) Applicant: Florida A&M University, Tallahassee, FL (US)

(72) Inventor: Charles Magee, Cairo, GA (US)

(73) Assignee: Florida A&M University, Tallahassee, FL (US)

( * ) Notice: Subject to any disclaimer, the term of this patent is extended or adjusted under 35 U.S.C. 154(b) by 233 days.

(21) Appl. No.: 18/298,774

(22) Filed: Apr. 11, 2023

Related U.S. Application Data

(63) Continuation-in-part of application No. 16/566,231, filed on Sep. 10, 2019, now abandoned.

(60) Provisional application No. 62/729,121, filed on Sep. 10, 2018.

(51) Int. Cl.
| | |
|---|---|
| *A61F 13/0206* | (2024.01) |
| *A61F 13/00* | (2024.01) |
| *A61F 13/0203* | (2024.01) |
| *A61F 13/05* | (2024.01) |
| *A61L 15/18* | (2006.01) |
| *A61L 15/28* | (2006.01) |

(Continued)

(52) U.S. Cl.
CPC .... *A61F 13/0206* (2013.01); *A61F 13/00063* (2013.01); *A61F 13/0223* (2013.01); *A61F 13/05* (2024.01); *A61L 15/18* (2013.01); *A61L 15/28* (2013.01); *A61L 15/425* (2013.01); *A61L 15/46* (2013.01)

(58) Field of Classification Search
CPC .......... A61F 13/00063; A61F 13/00068; A61F 13/00; A61F 13/00008; A61F 13/00021; A61F 13/0246; A61F 13/0253; A61F 2013/00604; A61F 2013/00655; A61F 2013/00731; A61F 2013/00863; A61F 2013/00859; A61F 2013/00089; A61F 2013/00246; A61F 2013/00251; A61F 2013/00255; A61F 2013/00582; A61L 15/00; A61L 15/16; A61L 15/20; A61L 15/28; A61L 15/44; A61L 15/46; A61L 2300/00; A61L 26/00; A61L 26/0066; A61K 47/6939
USPC ............... 602/41–43, 47–49, 52, 54, 58, 59; 604/304, 307; 424/445–447
See application file for complete search history.

(56) References Cited

U.S. PATENT DOCUMENTS

| | | | | |
|---|---|---|---|---|
| 2008/0027365 A1* | 1/2008 | Huey | ...................... | A61L 15/44 602/44 |
| 2008/0312572 A1* | 12/2008 | Riesinger | .......... | A61F 13/01029 602/56 |

FOREIGN PATENT DOCUMENTS

| | | | | |
|---|---|---|---|---|
| CA | 2596321 A1 * | 2/2000 | .......... | A61M 1/0025 |
| WO | WO-2014075684 A1 * | 5/2014 | ......... | A61F 13/0209 |

\* cited by examiner

*Primary Examiner* — Caitlin A Carreiro
(74) *Attorney, Agent, or Firm* — Andrew Behrens; Smith & Hopen, P.A.

(57) ABSTRACT

An osmotic bandage for treating wounds, such as cuts, abrasions, minor burns, blisters, and post-surgical incisions. The bandage includes a bandage strip with an adhesive along with a plurality of apertures or airholes disposed therethrough for breathability. The bandage further includes a multi-layered gauze pad. The multi-layered gauze pad includes a first layer, a second salt laced layer, and a third odor-reducing layer. The salt is a natural bactericide, through the dehydration of water in bacteria, and kills any bacteria that attempt to invade or enter the wound site. A semi-permeable membrane cover may be disposed in overlying (Continued)

relation to the pad to prevent the salt from being in direct contact with the wound tissue and causing the patient pain.

20 Claims, 13 Drawing Sheets

(51) Int. Cl.
*A61L 15/42* (2006.01)
*A61L 15/46* (2006.01)

OSMOTIC BANDAGE

CROSS-REFERENCE TO RELATED APPLICATIONS

This non-provisional application is a continuation-in-part of and claims priority to nonprovisional application Ser. No. 16/566,231, entitled "Osmotic bandage," filed Sep. 10, 2019 by the same inventor, which claims priority to provisional application No. 62/729,121, entitled "OSMOTIC BANDAGE," filed Sep. 10, 2018 by the same inventor.

BACKGROUND OF THE INVENTION

1. Field of the Invention

This invention relates, generally, to wound care, including drainage, infection, and swelling of wounds. More specifically, it relates to bandages used in wound care.

2. Brief Description of the Prior Art

Every day, thousands of medical professionals, and people all over the world use bandages for covering and protecting wounds. It has long been determined that a covered, well-drained wound will heal faster than an uncovered, poorly-drained one. The bandages are used to absorb exudate, including blood and bodily fluids, and to protect the wound from becoming infected. Most wounds require drainage to prevent infection. However, swelling, poor drainage, and infection are some of the problems associated with post-surgical incisions and other open wounds. Present bandage technologies do not adequately address the problems noted above.

Many doctors recommend using a saltwater solution for cleaning wounds and post-surgical incisions. For example, U.S. Pat. No. 4,608,044 ('044 Patent) to Nordqvist is directed to the impregnation of a compress with a saltwater solution that is then dried to evaporate substantially all of the water present to provide a dry compress. The compress is separate from the bandage itself and is applied to the wound using a spatula. However, the bandage disclosed in the '044 Patent has significant drawbacks. For instance, during the time between the drying of the compress and its application, there is a substantial risk of abrasions and further irritation of the wound. Further, applying the compress impregnated with salt directly to the wound causes pain at the application site for a short period of time.

Accordingly, what is needed is an improvement in drainage, infection prevention, and swelling during wound care with a simple, all-in-one osmotic bandage that is ready and easy to apply at a moment's notice. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an osmotic bandage having a multi-layered gauze pad that improves drainage, prevents infection, reduces odor, and reduces swelling of a wound site is now met by a new, useful, and nonobvious invention.

The novel structure includes a multi-layered gauze pad of the osmotic bandage for the improvement of drainage, infection prevention, and swelling of a wound site. The bandage strip includes a first surface and a second surface. In an embodiment, the bandage strip may be formed from a non-elastic cellulose-based fiber material. The osmotic bandage may in some embodiments be a bandage tape. The first surface has an adhesive portion, such as a dermal adhesive, and a multi-layered gauze pad that resides adjacent to the first surface. In an embodiment, the osmotic bandage may include an antibiotic to prevent infection of the wound site. The multi-layered gauze pad has a first, second, and third layer. The second layer being disposed between the first layer and the third layer. The first layer is distally positioned relative to the first surface and includes a gauze pad configured to contact the wound site. In an embodiment, the gauze pad is formed from a wicking material that wicks an exudate from the wound site allowing the exudate to be absorbed into the first surface by capillary action. The second layer includes a salt-laced gauzed pad. The salt facilitates the movement of exudate from the wound site to the first layer allowing for the drainage of the wound site via osmosis. The third layer is positioned proximal relative to the first surface and includes an odor masking compound configured to mask an odor given off from an exudate. In an embodiment, the odor masking compound may be sodium bicarbonate. The osmotic bandage improves the drainage, prevents infection, and reduces odor and swelling the wound site.

An object of the invention includes a semi-permeable membrane between the third layer and the second layer. The semi-permeable membrane is configured to separate water from blood particles draining from the wound site. This allows the blood particles to dry quickly, thereby preventing infection of the wound site as dried blood has a greater resistance to bacteria colonization than wet blood.

In an embodiment of the invention, the osmotic bandage may include a plurality of apertures disposed through the bandage strip from the first surface to the second surface. The apertures increase circulation of air from an area outside the bandage to an area adjacent to the wound site.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

The present invention includes an osmotic bandage having a novel multi-layered gauze pad that is intended to improve drainage, prevent infections, reduce odor, and reduce the swelling of wounds such as cuts, abrasions, minor burns, blisters, and post-surgical incisions. The multi-layered gauze pad may include an absorption gauze layer, a salt-laced gauze layer, and an odor reducing gauze layer. The multi-layered gauze pad of the osmotic bandage further prevents the transmission of bloodborne pathogens from an open wound site to objects that may come in contact with the wound site. As such, the current osmotic bandage would greatly improve drainage, infection prevention, and swelling in wound care.

Figure 1A:
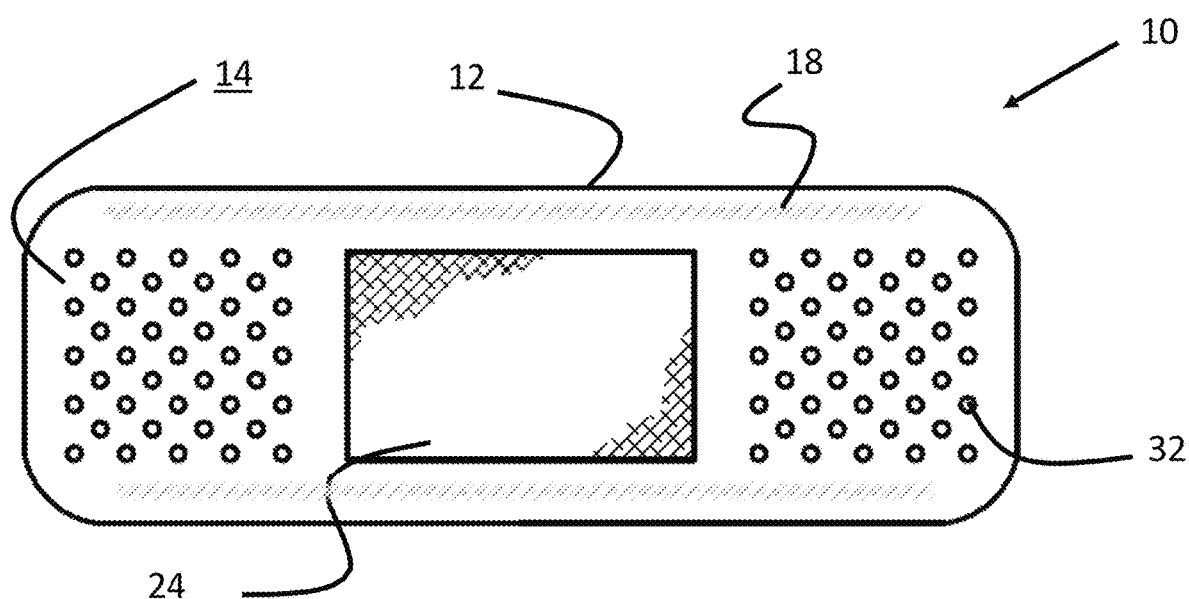
FIG. 1A depicts an embodiment of the osmotic bandage showing the multi-layered gauze pad on a first surface of the osmotic bandage.
Figure 1B:
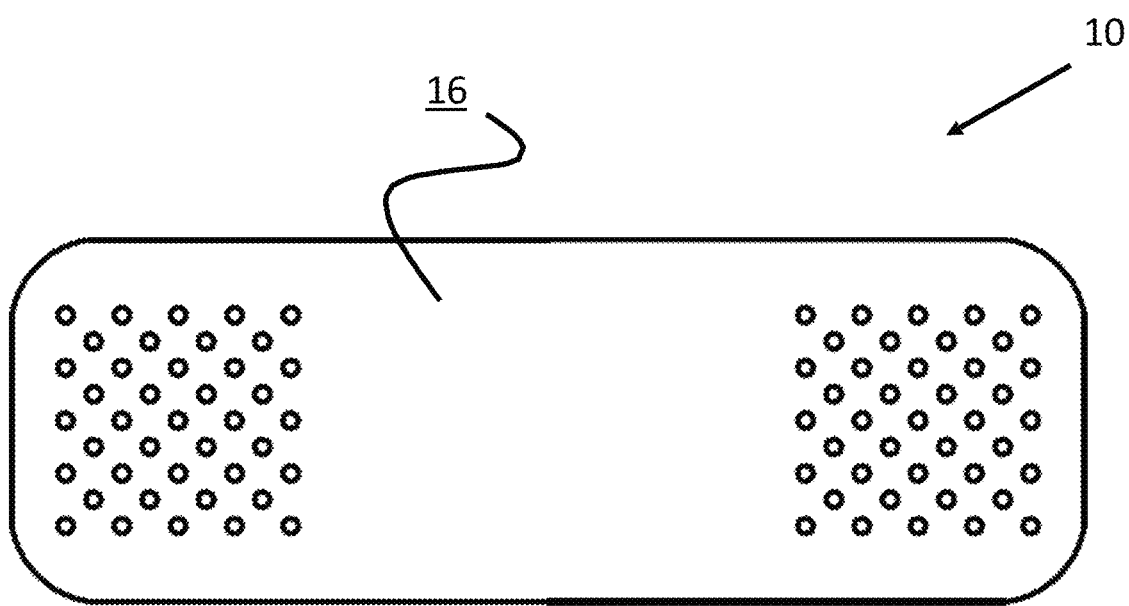
FIG. 1B depicts an embodiment of a second surface of the osmotic bandage.

In an embodiment, depicted in FIGS. 1A and 1B is an osmotic bandage (hereinafter "bandage") 10 that comprises bandage strip 12, adhesive 18, and multi-layered gauze pad 24. Bandage 10 is preferably elongated and formed of a non-elastic cellulose-based fiber material that is flexible enough to form to the contours of an area surrounding the wound site when applied to the patient. The shape and size of bandage 10 may be formed of various other geometries depending on the size and shape of the wound site that bandage 10 is intended to cover and protect. In an embodiment, bandage 10 may be formed of an elastic material, polypropylene, polyurethane, plastic, cloth or other woven material, paper, synthetic materials including latex, rubber, or any other material suitable for forming bandage 10 that is known in the art. In an embodiment, the osmotic bandage may be a bandage tape, or any other style bandage known in the art.

Bandage strip 12 includes first surface 14 configured to secure to a portion of the patient's skin when bandage 10 is applied to the patient. First surface 14 is opposite second surface 16 which is gripped by a patient during the application of bandage 10 to the patient's skin. In an embodiment, bandage strip 12 is nonporous, waterproof, impermeable to bodily fluids, and may be sterilized. Adhesive 18 resides on at least a portion of first surface 14 and alternatively may coat the entire first surface 14, wherein adhesive 18 is configured to removably affix first surface 14 of bandage 10 to the patient's skin. Adhesive 18 may be any adhesive known in the art to removably secure bandage 10 to a patient, such as a dermal adhesive, acrylate, methacrylate, epoxy, epoxy diacrylates, or vinyl resins.

Multi-layered gauze pad 24 is disposed on first surface 14, such that multi-layered gauze pad 24 contacts a wound site of the patient during use of bandage 10. Multi-layered gauze pad 24 is configured to improve the drainage, prevent infection, and reduce the swelling of the surrounding wound site. In an embodiment, bandage strip 12 further includes a plurality of apertures 32 that are disposed from first surface 14 through second surface 16 that allow for the circulation of air from an area outside bandage 10 to an area surrounding the wound site and are designed to improve the healing process through the increased air circulation. Apertures 32 may be arranged in a pattern or may be randomly spaced apart from one another.

Figure 2A:
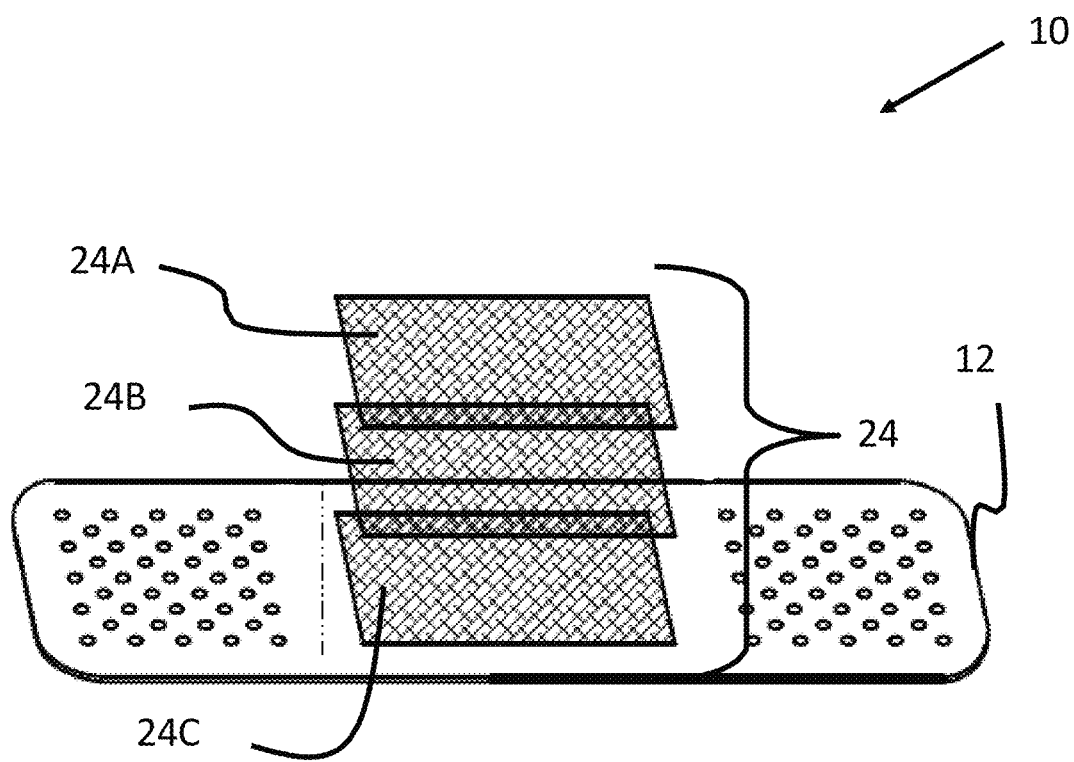
FIG. 2A depicts an embodiment of the osmotic bandage showing an exploded view of the gauze pad having three layers.
Figure 2B:
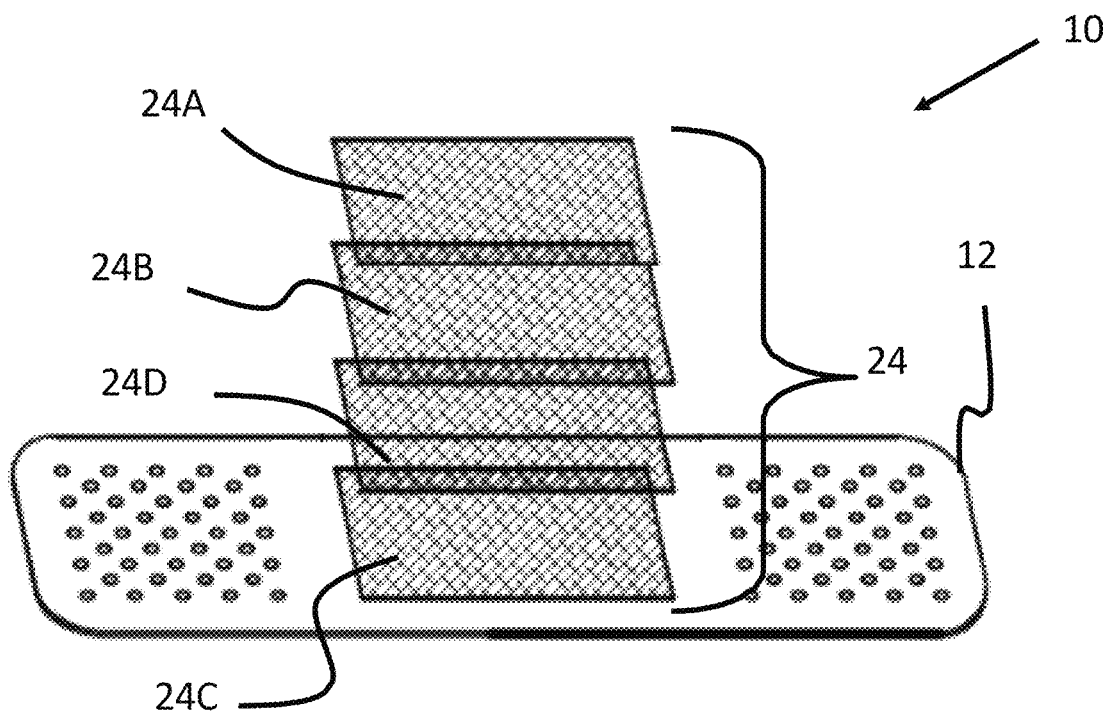
FIG. 2B depicts an embodiment of the osmotic bandage showing an exploded view of the gauze pad having four layers.

FIGS. 2A and 2B depict exploded views of a multi-layered gauzed pad 24 adhered to first surface 14 of bandage strip 12. Multi-layered gauze pad 24 may include first gauze pad 24A, second gauze pad 24B, and third gauze pad 24C. First gauze pad 24A is positioned in the most proximal position in relation to bandage strip 12 and designed to directly contact the wound side and to absorb exudate. First gauze pad 24A is formed of dressing material that is absorbent of blood and other bodily fluids and is designed to wick an exudate from the wound site to multi-layered gauze pad 24. In an embodiment, other dressing materials, such as synthetic fibers or cotton dressing materials, may be used that provide for the absorption of blood and other bodily fluid.

Disposed between first gauze pad 24A and third gauze pad 24C, second gauze pad 24B is formed of a dressing material that is impregnated with salt 26, such as sodium chloride. Salt 26 is a natural bactericide and kills any bacteria that attempt to invade or enter the wound site, via dehydration of water in bacteria. Food scientists and processors have taken advantage of this scientific fact for many years. Further, salt 26 partially dehydrates cells in tissue in and around the wound, causing the cells to be in a partial flaccid state. This, in turn, reduces and/or prevents swelling around the wound. An added benefit of using salt 26 is that it is natural and safe. In an embodiment, second gauze pad 24B is soaked or sprayed with a solution containing saltwater or saline until second gauze pad 24B is saturated with the solution. The saturated second gauze pad 24B is then dried to evaporate the water of the solution from second gauze pad 24B, thereby leaving behind salt 26 disposed throughout second gauze pad 24B. In another embodiment, crystals of salt 26 are embedded into second gauze pad 24B such that the embedding process does not require saturation and drying. Similarly, in an embodiment, third gauze pad 24C may be soaked or sprayed with a solution containing sodium bicarbonate or another odor-reducing solution until third gauze pad 24C is saturated with the solution. The saturated third gauze pad 24C is then dried to evaporate the water of the solution from third gauze pad 24C, thereby leaving behind sodium bicarbonate or another odor-reducing compound disposed throughout third gauze pad 24C. In another embodiment, crystals of sodium bicarbonate or another odor-reducing solution are embedded into third gauze pad 24C such that the embedding process does not require saturation and drying. In an embodiment, when applied as a sanitary pad for female hygiene, sodium bicarbonate aids in balancing the pH levels of female genitals.

The osmotic process dictates that a solution with a higher chemical potential migrates into a solution with lower chemical potential to achieve homeostasis. Thus, when second gauze 24B is laced with salt 26, water in the blood and bodily fluids, which has a higher chemical potential, migrates to the salt-laced second gauze pad 24B of bandage 10, thus draining the wound via osmosis. This drainage process is quicker than that of conventional bandages, due to the added effect of salt 26, and results in increased blood circulation through the wound, thus also decreasing the healing time of the wound.

Third gauze pad 24C is positioned proximate to first surface 14 and includes an odor masking compound. The odor masking compound reduces the potency of scents emitted from blood and discharge fluids. In an embodiment, the odor masking compound may be sodium bicarbonate, or any other compound or combination of compounds known in the art to mask an odor.

In an embodiment, as depicted in FIG. 2B, a semi-permeable membrane 24D is disposed between the third gauze pad 24C and the second gauze pad 24B. As blood and bodily fluids released from the wound site pass through semi-permeable membrane 24D during the absorption process, semi-permeable membrane 24D separates water from the blood and bodily fluids, which allows the blood particles to dry quickly, thereby preventing infection of the wound site. Dried blood particles are less susceptible to harmful bacterial growth helping to prevent the infection of the wound site. Semi-permeable membrane 24D includes pores sized such that the exudate from the wound site may pass through semi-permeable membrane 24D, but are small enough that salt 26 particles are unable to pass through membrane 26. In an embodiment, during drainage of the wound site, the pores of semi-permeable membrane 24D are large enough to allow for the drainage of the exudate from the wound site, but remain small enough to prevent solid materials from passing through semi-permeable membrane 24D to contact the wound site. In an embodiment, the semi-permeable membrane allows water and oxygen to pass through. In an embodiment, multi-layered gauze pad 24 may be incorporated into female hygiene products, including tampons and menstrual pads, preferably during times of light menstrual flow.

Figure 3A:
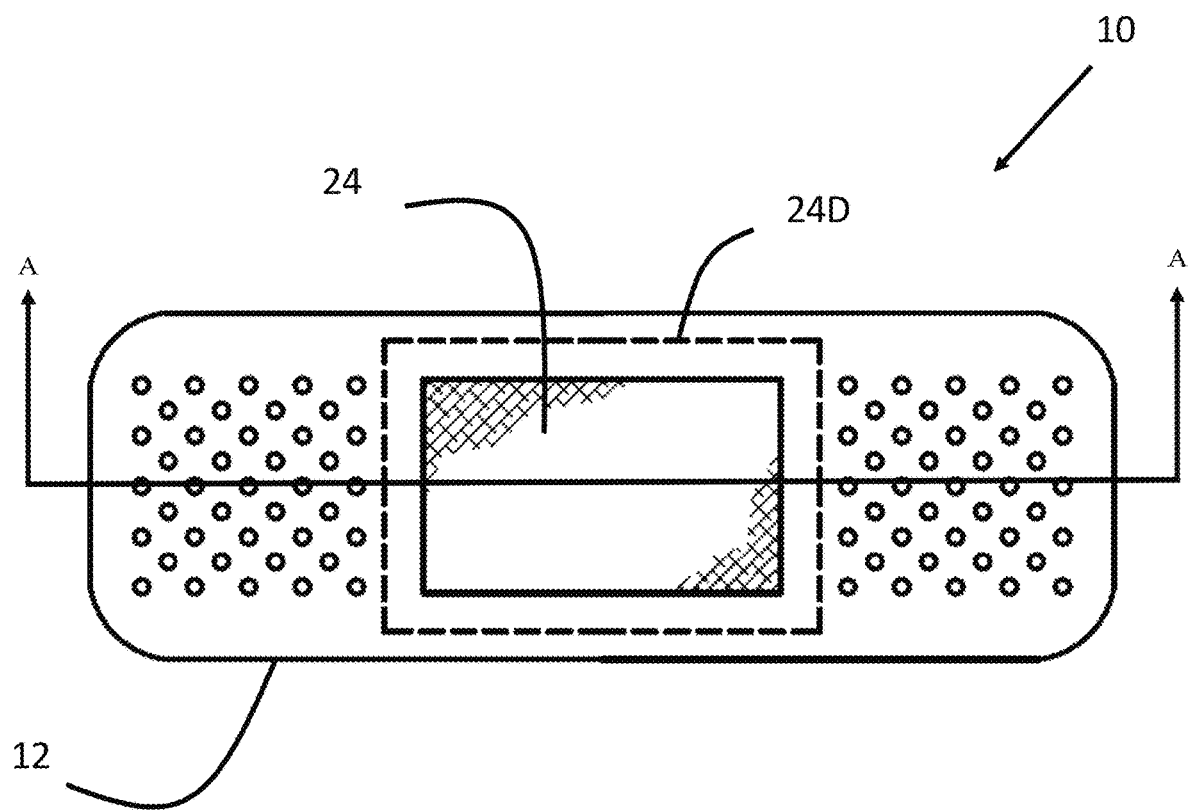
FIG. 3A depicts an alternate embodiment of the osmotic bandage showing semi-permeable membrane disposed over multi-layered gauze pad.
Figure 3B:
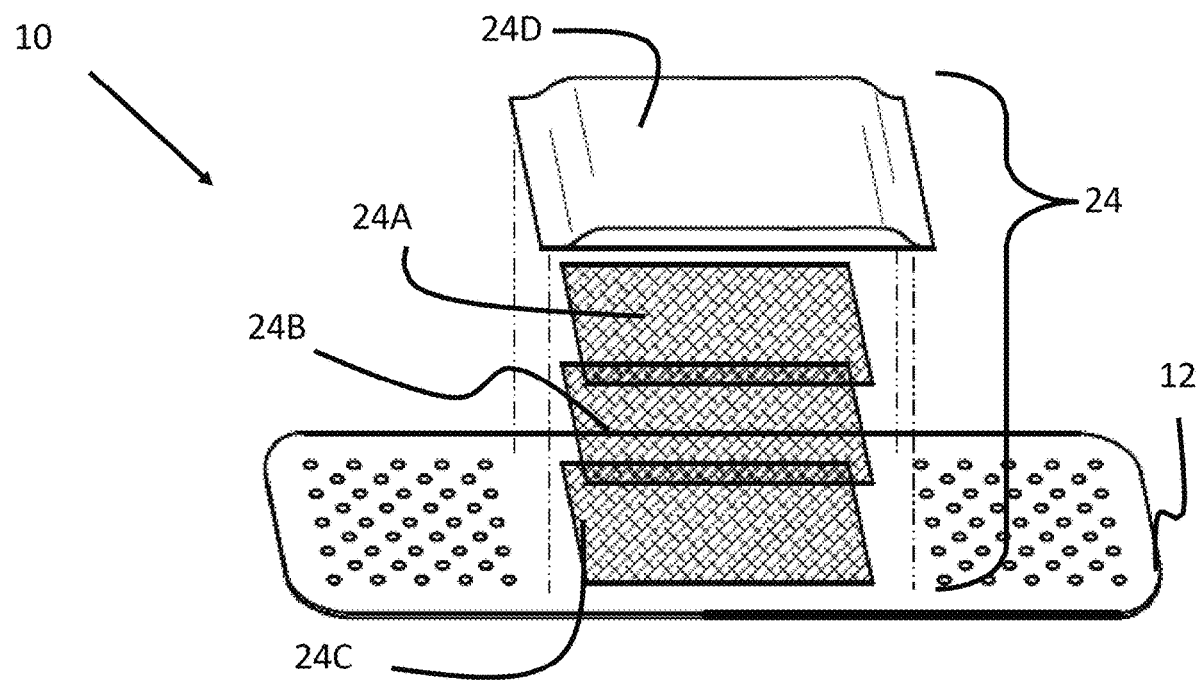
FIG. 3B depicts an exploded view of an alternative embodiment of an osmotic bandage showing the first, second, and third layers of the multi-layer gauze pad with a semi-permeable membrane disposed thereover.
Figure 3C:
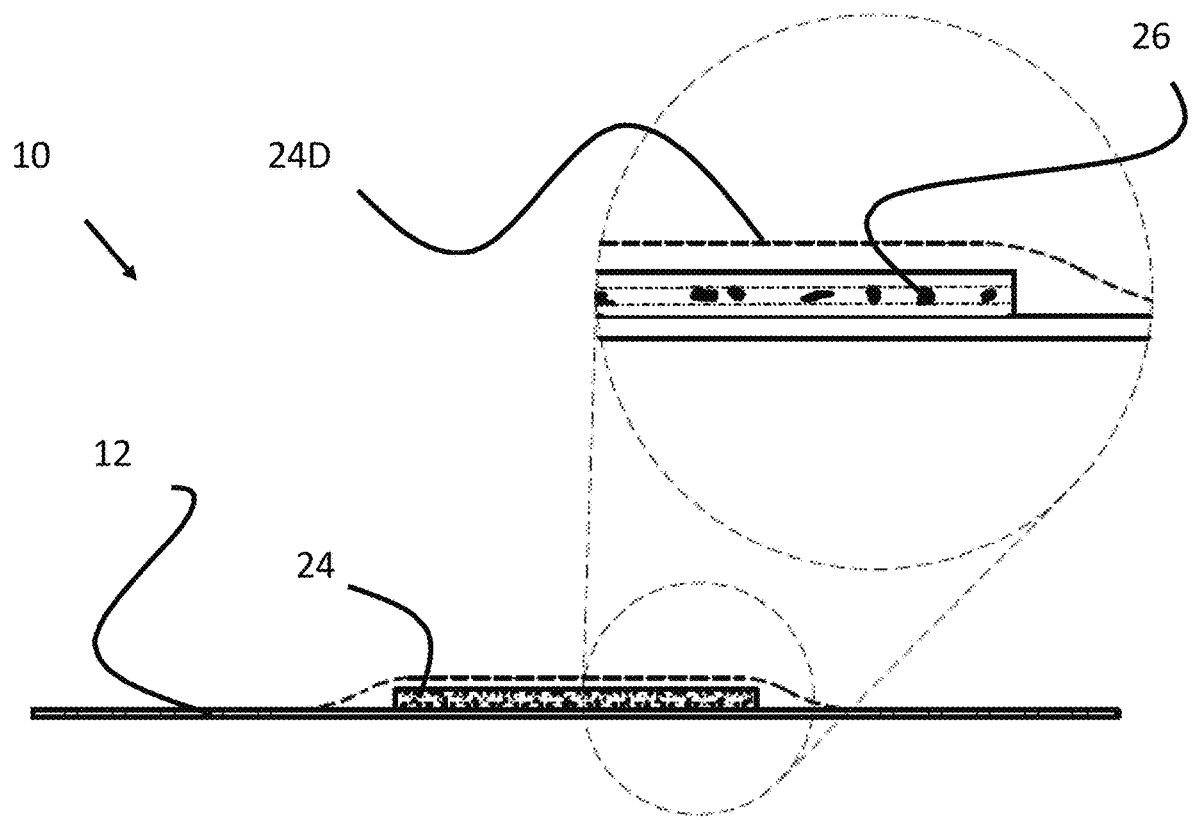
FIG. 3C depicts a view of an alternative embodiment taken along line A-A of FIG. 3A depicting a cut away view of the semi-permeable membrane disposed over the multi-layered gauze pad.

In an embodiment, bandage 10 is depicted in FIGS. 3A-C having semi-permeable membrane 24D disposed in an overlying fashion first layer 24A, second layer 24B, and third layer 24C of multi-layered gauze pad 24. During drainage of the wound site, the pores of semi-permeable membrane 24D are large enough to allow for the drainage of the exudate from the wound site, but remain small enough to prevent solid materials from passing through membrane 24D to contact the wound site. When bandage 10 is applied to the patient's skin, semi-permeable membrane 24D prevents solid materials, such as salt 26, from contacting the wound site. Similarly, when bandage 10 is used in female hygiene products to absorb vaginal discharge, disposing semi-permeable membrane 24D over multi-layered gauze pad 24, prevents salt 26 disposed in second gauze pad 24B and/or sodium bicarbonate disposed in third gauze pad 24C from contacting vaginal tissue causing irritation or other adversely related medical problems from direct exposure to salt and sodium bicarbonate. Further, when bandage 10 is used as a sanitary device for female hygiene, adhesive 18 may be removed from first surface 14. Additionally, solid materials such as blood cells are prevented from entering the multi-layered gauze pad 24 and are trapped by semi-permeable membrane allowing for water and other bodily fluid from passing through, leaving solids such as blood cells behind to dry. This helps to prevent infection of the wound site as it is more difficult for bacteria to colonize dried blood cells as compared to wet blood cells.

Figure 4:
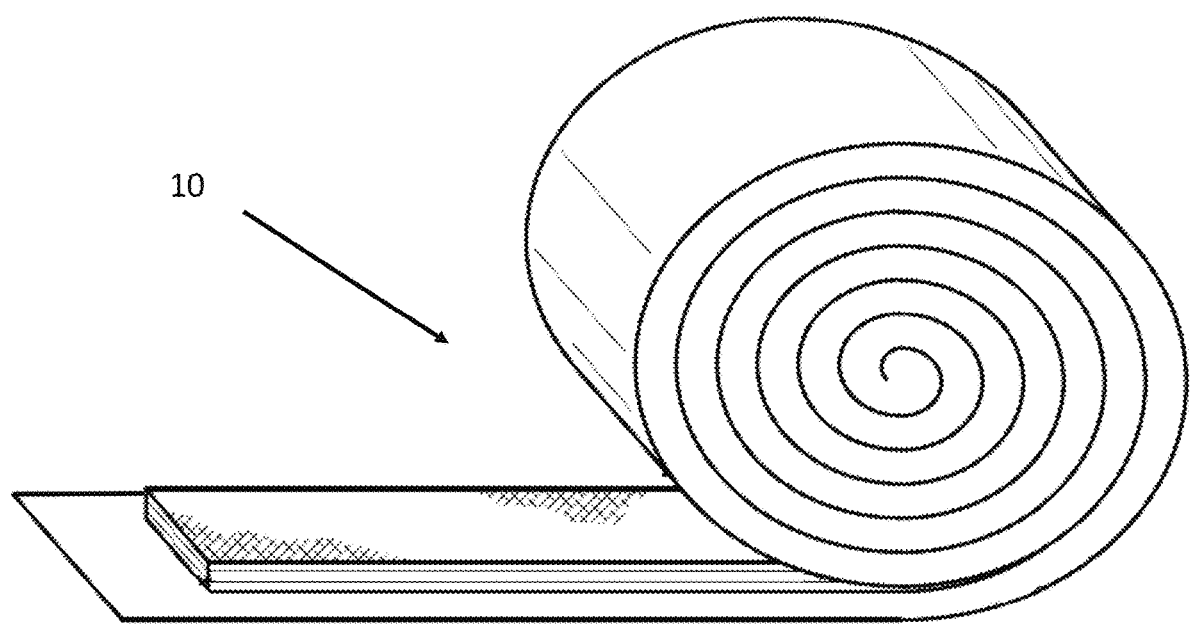
FIG. 4 depicts an embodiment of the present invention where the osmotic bandage is a bandage tape.

In an embodiment, as depicted in FIG. 4, bandage 10 is configured to be in the form of a tape. Unrolling bandage 10 allows for a patient to cut bandage 10 at a predetermined length needed to cover the wound site. In the event that the wound site is wider than the width of bandage 10, two or more strips may be placed adjacent to one another to cover the wound site.

Figure 5:
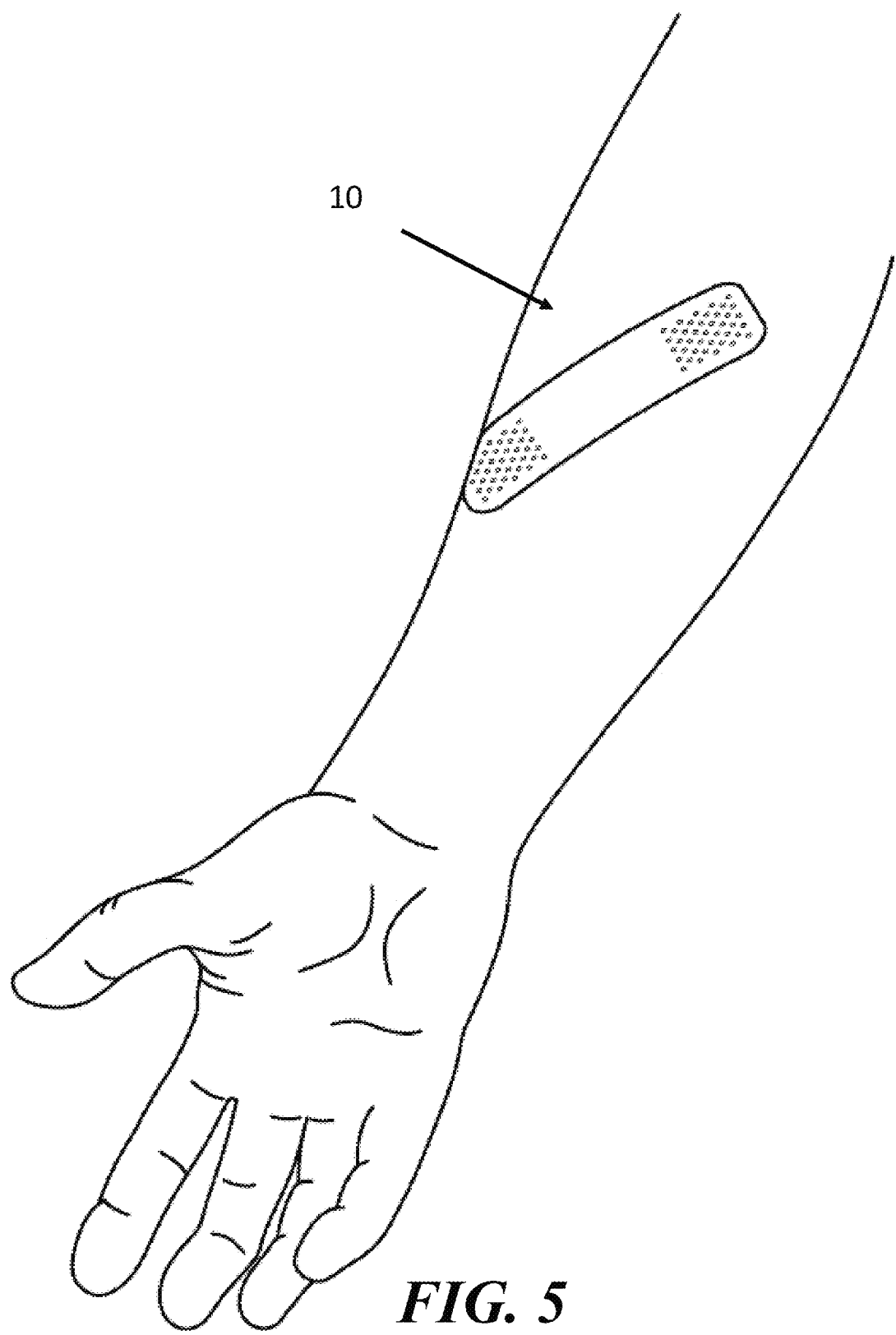
FIG. 5 depicts an in-use embodiment of the invention where an embodiment of the novel invention is disposed over a wound site of a patient and adhered to the skin of a forearm.

FIG. 5 depicts bandage 10 adhered to a forearm of a patient and completely covers the wound site. The bandage 10 prevents the exudate, including blood and other bodily fluids from leeching out and escaping the bandage. Bandage 10 improves the drainage, prevents infections, and reduces the swelling of wounds such as cuts, abrasions, minor burns, blisters, and post-surgical incisions. As such, the current osmotic bandage greatly improves drainage, infection prevention, and swelling in wound care.

Figure 6:
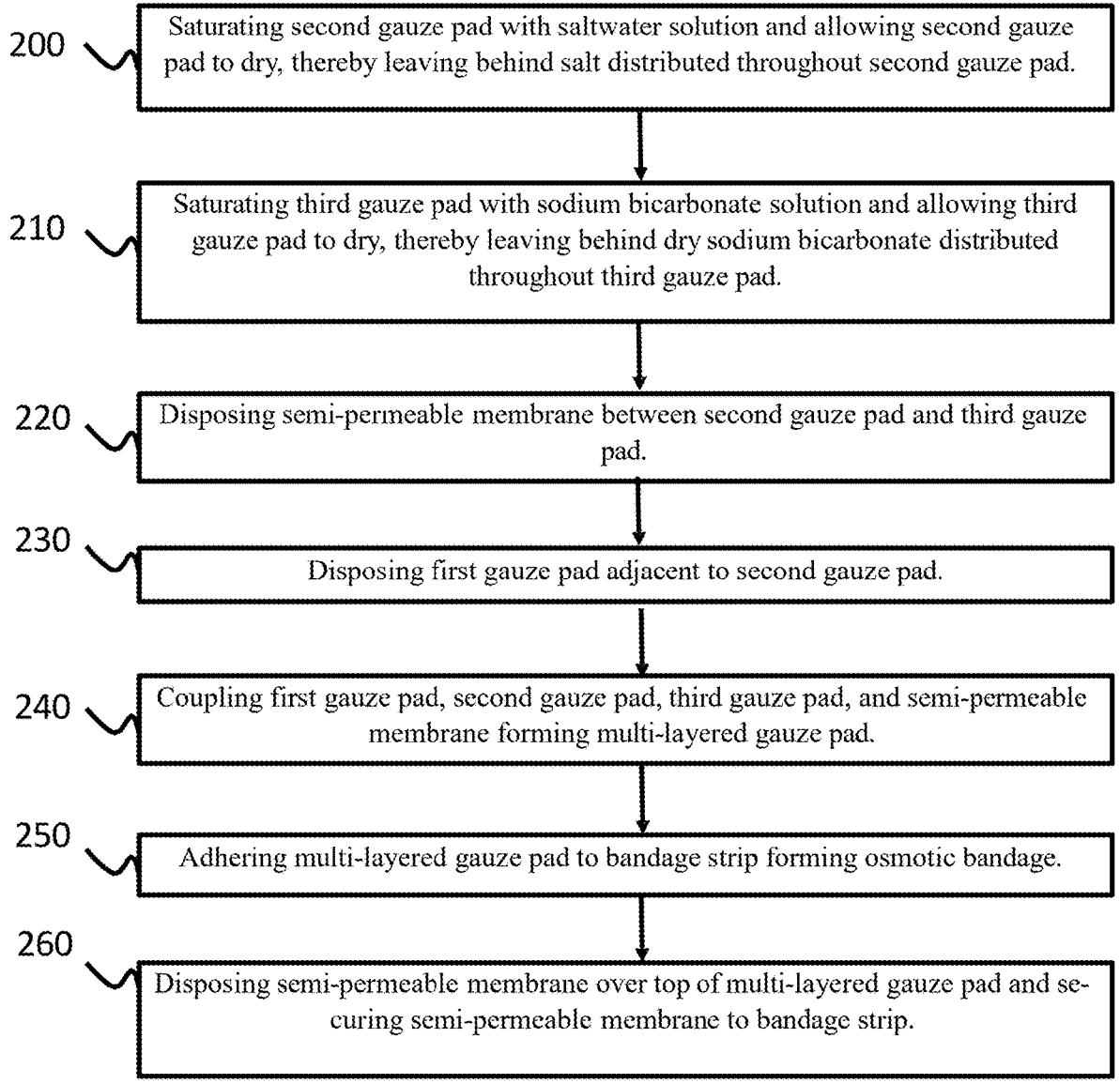
FIG. 6 depicts an exemplary process-flow diagram describing a method for assembly of the osmotic bandage.

Referring now to FIG. 6, in conjunction with FIGS. 1-5, an exemplary process-flow diagram is provided, depicting a method for the assembly of osmotic bandage 10. The steps delineated in the exemplary process-flow diagram of FIG. 6 are merely exemplary of a preferred order for the assembly of osmotic bandage 10. The steps may be carried out in another order, with or without additional steps included therein. Additionally, the steps may be carried out with an alternative embodiment of bandage 10, as contemplated in the description above.

The method for the assembly of bandage 10 begins at step 200 where second gauze pad 24B is saturated with a saltwater solution and allowed to dry thereby evaporating the water from the saltwater solution leaving behind salt 26 distributed throughout second gauze pad 24B. At step 210, third gauze pad 24C is saturated with a sodium bicarbonate solution and allowed to dry thereby evaporating the water from the sodium bicarbonate solution leaving behind dry sodium bicarbonate distributed throughout third gauze pad 24C. Next, in step 220, semi-permeable layer 24D is disposed between second gauze pad 24B and third gauze pad 24C. First gauze pad 24A is then disposed adjacent to second gauze pad 24B in step 230. In step 240, the first gauze pad 24A, second gauze pad 24B, third gauze pad 24C, and semi-permeable layer 24D are coupled together using adhesive 18 forming multi-layered gauze pad 24. In an embodiment, gauze pad layers 24A-C and semi-permeable layer 24D may be coupled together with stitching or any other method known in the art to combine the layers to form multi-layered gauze pad 24. At step 250, multi-layered gauze pad 24 is then coupled to bandage strip 12 preferably using adhesive 18, stitching, or any other means known to adhere multi-layered gauze pad 24 to bandage strip 12 forming bandage 10. In an embodiment, step 260 may be provided which disposes semi-permeable layer 24D over top of multi-layered gauze pad 24 once multi-layered gauze pad 24 is secured to bandage strip 12, such that when the semi-permeable layer 24D is coupled to bandage strip 12 multi-layered gauze pad 24 is disposed between bandage strip 12 and semi-permeable layer 24D as depicted in FIGS. 3A and 3B.

Figure 7A:
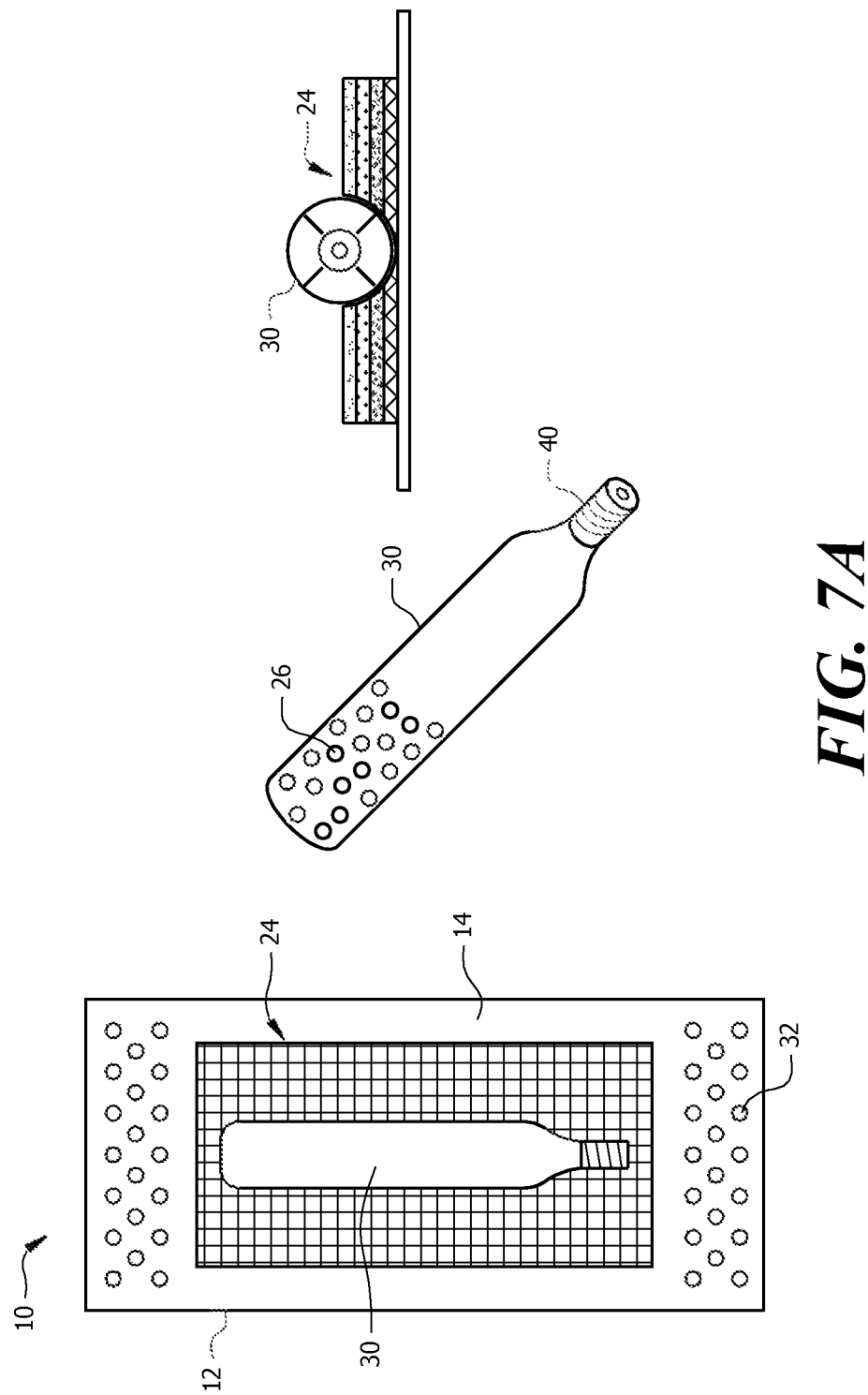
FIG. 7A depicts an embodiment of the osmotic bandage showing a multi-layered gauze pad and a drain tube on a first surface of the osmotic bandage.
Figure 7B:
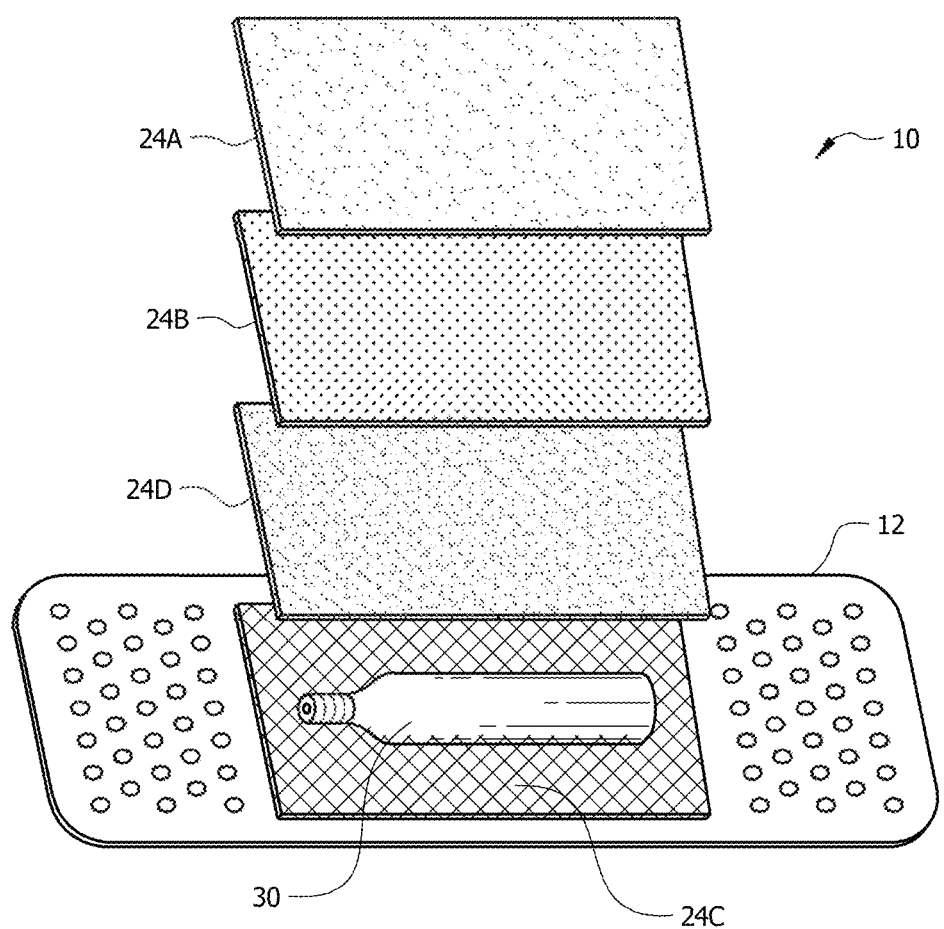
FIG. 7B depicts an embodiment of the osmotic bandage showing an exploded view of the gauze pad having three layers and a drain tube.
Figure 7C:
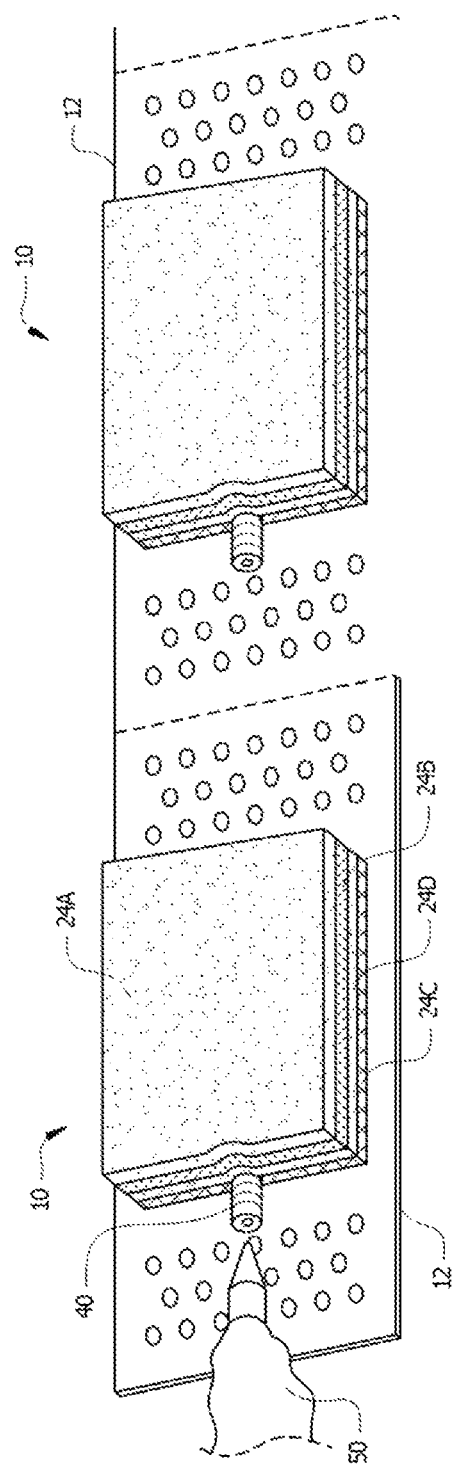
FIG. 7C depicts an embodiment of the osmotic bandage showing a multi-layered gauze pad and a drain tube with a terminal attachment point proximate to a first surface of the osmotic bandage.

In an embodiment, as shown in FIGS. 7A-7C, bandage 10 includes multi-layered gauze pad 24 including drain tube 30 embedded therein. Drain tube 30 is made of a flexible material, such that drain tube 30 is capable of increasing and decreasing in volume without rupturing, and such that drain tube 30 is capable of rebounding to a position of repose in the absence of an excess or deficit of fluid disposed within drain tube 30. The flexibility of drain tube 30, in addition to the flexibility of multi-layered gauze pad 24 and bandage 10 overall, is such that drain tube 30 (as well as bandage 10) is configured to contour to a shape of a wound site to which bandage 10 is applied without rupture or collapse.

Multi-layered gauze pad 24 is secured to (such as via adhering) first surface 14 of bandage strip 12, with multi-layered gauze pad 24 including a plurality of layers in addition to drain tube 30. For example, in an embodiment (as shown in particular in FIGS. 7A-7C), multi-layered gauze pad 24 includes first gauze pad 24A, second gauze pad 24B, and third gauze pad 24C, in addition to drain tube 30. In an embodiment of multi-layered gauze pad 24, drain tube 30 is disposed between second gauze pad 24B and third gauze pad 24C, with third gauze pad 24C being directly in contact with first surface 14 of bandage strip 12, and with second gauze pad 24B being disposed between drain tube 30 and first gauze pad 24A. As such, in an embodiment, third gauze pad 24C is disposed about and receives a bottom portion of drain tube 30, and second gauze pad 24B is disposed about and receives a top portion of drain tube 30, such that third gauze pad 24C and second gauze pad 24B together enclose drain tube 30 therebetween. It should be appreciated, however, that embodiments of bandage 10 can include drain tube 30 disposed between first gauze pad 24A and second gauze pad 24B, and that multiple drain tubes x can be implemented between subsequent gauze pads of bandage 10.

Moreover, in an embodiment, drain tube 30 defines a plurality of fluid flow channels therethrough. In an initial configuration (i.e., prior to application to a wound site), at least a portion of the plurality of fluid flow channels includes an amount of salt 26 disposed therein. The amount of salt 26 enhance drainage when water from the exudate dissolve salt 26 during application of bandage 10. Moreover, during the fluid flow, the plurality of fluid flow channels formed within drain tube 30 increase the flow of water and other fluids due to osmotic and capillary forces, with the fluid traveling through the plurality of fluid flow channels being retained within an internal fluid compartment defined by drain tube 30.

As shown in particular in FIG. 7C, an embodiment of drain tube 30 includes terminal attachment point 40 that extends in a direction away from multi-layer gauze pad 24, such that terminal attachment point 40 is disposed adjacent to or spaced apart from top surface 14 of bandage 10. Terminal attachment point 40 defines an opening therethrough, such that the opening is in fluidic communication with the internal fluid compartment defined by drain tube 30. During use of bandage 10, the internal fluid compartment is configured to receive and retain an amount of fluid therein. As such, in an embodiment of bandage 10, external fluid chamber 50 is selectively couplable to terminal attachment point 40, such that the fluid disposed within the internal fluid compartment defined by drain tube 30 can be removed and collected within external fluid chamber 50, thereby evacuating at least a portion of the fluid disposed within drain tube 30. As such, an embodiment of bandage 10 is implementable within an undergarment, such that second surface 16 of bandage strip 12 adheres to the undergarment for the collection of fluids via multi-layer gauze pad 24 and drain tube 30, such as during a menstrual flow. Further, embodiments of bandage 10 and the external fluid chamber 50 are configured to receive and evacuate urine or other bodily fluids, such as for patients experiencing symptoms relating to incontinence.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An osmotic bandage for improved drainage at a wound site, the osmotic bandage comprising:
 a bandage strip including a first surface opposite a second surface, the first surface having an adhesive portion;
 a multi-layered dressing pad coupled to the first surface, the multi-layered dressing pad including a plurality of discrete layers, wherein one of the plurality of discrete layers is disposed proximate to the first surface of the bandage strip; and
 a drainage tube disposed between adjacent layers of the plurality of discrete layers, such that the drainage tube is spaced apart from the first surface of the bandage strip, the drainage tube defining an internal compartment and including a discontinuous outer surface that defines a plurality of fluid flow channels therein, such that the plurality of fluid flow channels are in fluidic communication with the internal compartment;

the one of the plurality of discrete layers that is disposed proximate to the first surface of the bandage strip being configured to contact the wound site;

a second layer of the plurality of layers including a salt-laced gauze pad having an amount of salt infused therein, wherein the amount of salt is configured to facilitate, via osmosis, movement of an exudate from the wound site to the multi-layered dressing pad, such that the second layer drains the wound site;

the drainage tube including an amount of salt disposed within each of the plurality of fluid flow channels defined by the drainage tube, wherein the amount of salt is configured to facilitate, via osmosis, movement of the exudate from the wound site to the multi-layered dressing pad, such that the drainage tube drains the wound site; and wherein the drainage tube comprises a terminal attachment point extending outward laterally along the center line of the bandage strip, the terminal attachment point defining a fluid pathway between the drainage tube and an external fluid chamber.

2. The osmotic bandage of claim 1, further comprising a third layer of the plurality of layers, the second layer of the plurality of layers being disposed between the third layer of the plurality of layers and the one of the plurality of discrete layers that is disposed proximate to the first surface of the bandage strip.

3. The osmotic bandage of claim 2, wherein the third layer of the plurality of layers includes an odor masking compound that is sodium bicarbonate.

4. The osmotic bandage of claim 2, wherein the drainage tube is disposed between the second layer of the plurality of layers and the third layer of the plurality of layers.

5. The osmotic bandage of claim 1, wherein the bandage strip defines a plurality of apertures disposed through the bandage strip from the first surface to the second surface, wherein the plurality of apertures are configured to increase circulation of air from an area outside the bandage to an area adjacent to the wound site.

6. The osmotic bandage of claim 1, wherein the one of the plurality of discrete layers that is disposed proximate to the first surface of the bandage strip is formed of a dressing material and configured such that the exudate from the wound site is be absorbed into the first surface by capillary action.

7. The osmotic bandage of claim 1, wherein the adhesive is a dermal adhesive configured to removably adhere the osmotic bandage to a layer of skin.

8. The osmotic bandage of claim 1, wherein the bandage strip is made of a non-elastic cellulose-based fiber material.

9. The osmotic bandage of claim 1, wherein the terminal attachment point includes an opening in fluidic communication with the internal compartment defined by the drainage tube, the opening allowing fluid flow from the internal compartment to an external fluid chamber.

10. An osmotic bandage for improved drainage at a wound site, the osmotic bandage comprising:

a flexible bandage strip including a first surface opposite a second surface, the first surface having an adhesive portion;

a multi-layered dressing pad coupled to the first surface, the multi-layered dressing pad including a first layer, a second layer, and a third layer, wherein the second layer is disposed between the first layer and the third layer, the third layer being disposed proximate to the first surface of the bandage strip; and a drainage tube disposed between the second layer and the third layer, the drainage tube defining an internal compartment and including a discontinuous outer surface that defines a plurality of fluid flow channels therein, such that the plurality of fluid flow channels are in fluidic communication with the internal compartment;

the first layer including a gauze pad configured to contact the wound site;

the second layer including a salt-laced gauze pad having an amount of salt infused therein, wherein the amount of salt is configured to facilitate, via osmosis, movement of an exudate from the wound site to the multi-layered dressing pad, such that the second layer is configured to drain the wound site;

the third layer including an odor masking compound configured to mask an odor from the exudate;

the drainage tube including an amount of salt disposed within each of the plurality of fluid flow channels defined by the drainage tube, wherein the amount of salt is configured to facilitate, via osmosis, movement of the exudate from the wound site to the multi-layered dressing pad, such that the drainage tube is configured to drain the wound site; and wherein the drainage tube comprises a terminal attachment point extending outward laterally along the center line of the bandage strip, the terminal attachment point defining a fluid pathway between the drainage tube and an external fluid chamber.

11. The osmotic bandage of claim 10, wherein the bandage strip defines a plurality of apertures disposed through the bandage strip from the first surface to the second surface, wherein the plurality of apertures are configured to increase circulation of air from an area outside the bandage to an area adjacent to the wound site.

12. The osmotic bandage of claim 10, wherein the first layer is formed of a dressing material and configured such that the exudate from the wound site is absorbed into the first surface by capillary action.

13. The osmotic bandage of claim 10, wherein the odor masking compound is sodium bicarbonate.

14. The osmotic bandage of claim 10, wherein the adhesive is a dermal adhesive configured to removably adhere the osmotic bandage to a layer of skin.

15. The osmotic bandage of claim 10, wherein the bandage strip is made of a non-elastic cellulose-based fiber material.

16. The osmotic bandage of claim 10, wherein the terminal attachment includes opening in fluidic communication with the internal compartment defined by the drainage tube, the opening allowing fluid flow from the internal compartment to the external fluid chamber.

17. An osmotic bandage for improved drainage at a wound site, the osmotic bandage comprising:

a flexible bandage strip including a first surface and a second surface, the first surface having an adhesive portion, and defining a plurality of apertures disposed through the bandage strip from the first surface to the second surface, wherein the plurality of apertures are configured to increase circulation of air from an area outside the bandage to an area adjacent to the wound site;

a multi-layered dressing pad coupled to the first surface, the multi-layered dressing pad including:

an absorption pad, a salt-laced gauze pad, a semi-permeable membrane, and a sodium bicarbonate laced pad, the salt-laced gauze pad being disposed between the absorption pad and the semi-permeable membrane, the semi-permeable membrane being disposed between the salt-laced gauze pad and the sodium bicarbonate laced pad, and the sodium bicarbonate laced pad being disposed proximate to the first surface of the bandage strip;

a drainage tube disposed between the salt-laced gauze pad and the absorption pad, the drainage tube defining an internal compartment and including a discontinuous outer surface that defines a plurality of fluid flow channels therein, such that the plurality of fluid flow channels are in fluidic communication with the internal compartment;

the gauze pad configured to contact the wound site;

the salt-laced gauze pad having an amount of salt infused therein, wherein the amount of salt is configured to facilitate, via osmosis, movement of an exudate from the wound site to the multi-layered dressing pad, such that the salt-laced gauze pad is configured to drain the wound site;

the drainage tube including an amount of salt disposed within each of the plurality of fluid flow channels defined by the drainage tube, wherein the amount of salt is configured to facilitate, via osmosis, movement of the exudate from the wound site to the multi-layered dressing pad, such that the drainage tube is configured to drain the wound site, the semi-permeable membrane configured to separate water from blood particles, such that blood particles are dried quickly thereby preventing infection of the wound site;

the sodium bicarbonate laced pad being configured to mask an odor produced by blood and discharge fluid from the wound site; and wherein the drainage tube comprises a terminal attachment point extending outward laterally along the center line of the bandage strip, the terminal attachment point defining a fluid pathway between the drainage tube and an external fluid chamber.

18. The osmotic bandage of claim 17, wherein the adhesive portion comprises a dermal adhesive configured to removably adhere the osmotic bandage to a layer of skin.

19. The osmotic bandage of claim 17, wherein the terminal attachment point includes an opening in fluidic communication with the internal compartment defined by the drainage tube, the opening allowing fluid flow from the internal compartment to the external fluid chamber.

20. The osmotic bandage of claim 17, wherein the external fluid chamber is selectively coupled to the terminal attachment point whereby fluid disposed within the internal compartment is transferred and collected within the external fluid chamber.

* * * * *